Nov. 12, 1957 A. V. JONASSON ET AL 2,812,916
SUPPORT FOR A CHRISTMAS TREE
Filed June 1, 1954 2 Sheets-Sheet 1

INVENTORS
AXEL V. JONASSON
BY WALTER R. GORNIAK
Charles L. Lovercheck
ATTORNEY

Nov. 12, 1957  A. V. JONASSON ET AL  2,812,916
SUPPORT FOR A CHRISTMAS TREE
Filed June 1, 1954  2 Sheets-Sheet 2

INVENTORS
AXEL V. JONASSON
BY WALTER R. GORNIAK
Charles L. Lovercheck
ATTORNEY

United States Patent Office 2,812,916
Patented Nov. 12, 1957

2,812,916

SUPPORT FOR A CHRISTMAS TREE

Axel V. Jonasson and Walter R. Gorniak, Erie, Pa.

Application June 1, 1954, Serial No. 433,515

2 Claims. (Cl. 248—44)

This invention relates generally to supports and more particularly to Christmas tree supports.

In supports made according to previous designs and with which we are familiar, the tree was held rigidly in position in the support and it was not convenient to adjust the tree to a vertical position. Furthermore, previous supports were difficult to attach to the tree and were cumbersome and inconvenient to store during periods of no use.

It is, accordingly, an object of our invention to overcome the above and other defects in prior Chirstmas tree supports and more particularly it is an object to provide a Christmas tree support which is simple in construction, economical to manufacture, and simple and efficient to use.

Another object of our invention is to provide a Christmas tree support which may easily be folded for storage.

Another object of our invention is to provide a Christmas tree support wherein the tree trunk supported therein may be adjusted through an angle of more than thirty degrees (30°) either side of vertical to a vertical position.

A further object of our invention is to provide a universal Christmas tree support having a novel means for fastening a Christmas tree thereto.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

Figure 1:
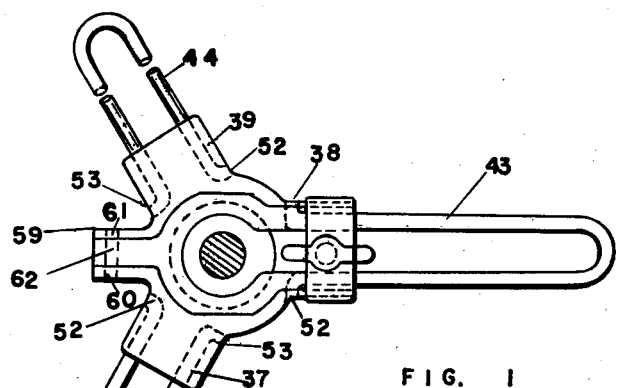
Fig. 1 is a Christmas tree support taken on line 1—1 of Fig. 3.

Now with more specific reference to the drawings, we show a Christmas tree support having a body portion 1 in the form of a container closed at the bottom which may contain water to enliven a tree supported in the support. The container may be circular in cross section and has an outwardly projecting portion 2 at either side of the upper portion thereof. Inside each outwardly extending portion 2 and 3, there are tree engaging members 4 and 5 swingably attached by means of a pin 6 received in the hole 7 on the tree engaging device. The engaging member 5 is swingably attached to the member 3 by means of the pin 9 which passes through a hole 10 in the tree engaging member 5 and through a hole 11 in the ear member. The pin 6 passes through holes in the side of the member 2. The upper portion of the tree engaging members is preferably bifurcated at 12 having the outwardly extending members 13 and 14 which engage a tree trunk. The points at the ends of the bifurcated members 13 and 14 may dig into the tree trunk to positively lock it in position. The tree engaging members 4 and 5 are pushed downward towards the tree and into engagement therewith by means of the threaded members or screws 16 and 17 which are threadably received in threaded holes 18 and 19, respectively, in the ear shaped members. The screws may have wing type heads 20 to facilitate their rotation manually and springs 22 and 23 urge the tree engaging members 4 and 5 upward against the force of the screws 16 and 17 in order to facilitate removal of the tree from the tree front.

The bottom portion of the body member 1 terminates in a preferably spherical shaped member 33 attached to the body member 1 by a neck portion 34. The spherical shaped member 33 is received in the hollow cleft 35 in the bracket 36. The bracket preferably has three bracket legs 37, 38, and 39 which have downwardly channel shaped members 40, 41, and 42 which receive the legs 43, 44, and 45, respectively. The legs 43, 44, and 45 are preferably U-shaped and have the horizontal floor engaging portion 49, the upwardly and inwardly extending portion 50, and the horizontal portion 51. The ends of the legs are turned outward at 52 and 53 to form hinge type members which engage holes 54 in the channel shaped members. Because of the U-shape of the leg members, they are in their unstretched position when the end members 52 are engaging the holes so that the spring action of the leg members 50 tend to urge the ends 52 and 53 into engagement with the holes.

The bracket member 36 has upwardly extending ear portions 58 and 59 through which are formed holes 60 and 61 and a pin 62 passes through the holes to pivotally lock the locking member 66. The central portion of the locking member 66 is hollow at 67 to engage the upper surface 68 of the spherical member. The end of the locking member opposite the pin 62 is bifurcated to form two legs 70 and 71 which extend on either side of the body member and permit the locking member to be swung upward around the pin 62 so that the body member 1 may be removed by removing bolt 76 and bracket 77 and sliding the neck 34 between the bifurcated leg members 70 and 71.

A threaded hole 75 is formed in the leg 38 and the bolt 76 extends through the hole 75. The U-shaped bracket 77 has legs 78 and 79 which extend on either side of the leg members 70 and 71 to hold them from spreading and a hole 80 is formed through the body portion 81 of the U-shaped member through which the bolts 76 extend. A wing head 82 is formed on the front end of the bolt 76 for convenience in tightening the bolts.

Figure 2:
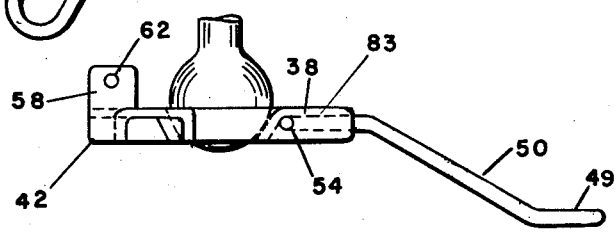
Fig. 2 is an enlarged side view of the support shown in Fig. 1 having certain parts broken away to better illustrate the invention.
Figures 3, 4:
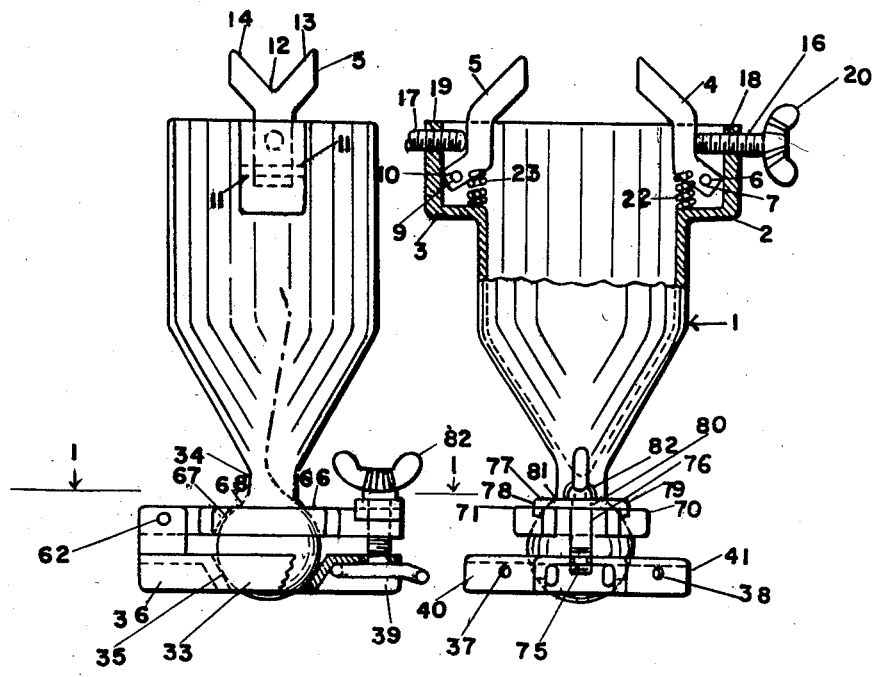
Fig. 3 is a side view of our novel Christmas tree support showing the locking means for locking the universal tree supporting member.
Fig. 4 is a side view of our novel Christmas tree support showing certain parts broken away to better illustrate the invention and showing the support rotated about a vertical axis ninety degrees from the position shown in Fig. 3.

In operation, the legs 43, 44, and 45 are swung outward to the position shown in Fig. 2 so that the upper portion of the horizontal member 51 of the leg is in engagement with the inner surface 83 of the leg member 38 and the other leg members are in similar unfolded relation. They will therefore be urged into tight engagement with the surface 83 as more weight is applied to the Christmas tree supported thereabove. The tree trunk will then be placed in the body member between the locking members 4 and 5 and the wing nut 20 will be rotated to force the screws 16 and 17 to force the members 4 and 5 against the force of the springs 22 and 23 to bring the points of the point members 13 and 14 into locking engagement with the tree trunk. The bottom portion of the tree trunk will rest against the inner lower edge of the reduced size portion of the body member. The tree trunk will thus be locked securely to the body member. The wing nut 82 will then be loosened so that the body portion 1 can be rotated around the vertical axis by causing the ball 33 to rotate against the hollow surface 35 of the base. The dotted line position 90 shows an extreme sidewise position to which the body member can be rotated. When the body member 1 is rotated to adjust the tree trunk to the desired vertical position, the wing nut 82 will be rotated to tighten the screw 76 to force the hollow portion 67 into locking engagement with the ball member 33 of the body member 1. The U-shaped member 77 will hold the legs 70 and 71 of the locking member from separating and spreading.

When it is desired to remove the tree, it is merely necessary to loosen the screws 16 and 17 to allow the springs 22 and 23 to urge the locking members 4 and 5 out of engagement with the tree trunk so the tree trunk can be removed. Then the legs 43, 44, and 45 can swing around their ends 52 and 53 to folded position for storage and, if desired, the wing screw 82 can be loosened and the body member 1 removed from the remainder of the support for convenience in storing.

In the foregoing specification, we have set forth the invention in its preferred practical forms but we are aware that the structure shown is capable of modification within a range of equivalents without departing from the invention which is to be understod is broadly novel as is commensurate with the appended claims.

The embodiments of the invention in which an exclusive property or privilege is claimed are defined as follows:

1. A support for a Christmas tree comprising a generally flat base member having an upwardly facing concave surface therein, a generally flat clamping member pivotally attached to said base member and having an opening extending therethrough with a downwardly facing concave surface overlying said concave surface on said base member, a slot through said clamping member extending laterally into said opening, a spherical member having a neck portion extending therefrom and projecting through said opening, said slot extending through the end of said clamping member remote from said pivotal attachment whereby said neck portion may be slid through said slot for assembly and disassembly purposes, said spherical member being normally seated in said concave surfaces, means to lock said clamping member to said base member with said spherical member in clamped relation therebetween, said locking means comprising a member overlying said clamping member and another member attached to said overlying member and to said base member, said last two mentioned members being disposed on the side of said spherical member opposite from the location where said clamping member is pivotally attached to said base member, and means to support a tree, said means comprising a cylindrical water container on the upper end of said neck portion integrally attached to said neck portion and having tree engaging members on the inner periphery thereof.

2. The support recited in claim 1 wherein said cylindrical container has outwardly extending portions attached to the sides adjacent the upper edge thereof, tree engaging members are pivotally attached to said outwardly extending portions and are swingable inwardly therefrom, the distal ends of said tree engaging members being bifurcated, and tree engaging prongs provided on the distal ends of the legs of the bifurcated members, said prongs being sharp and adapted to dig into the trunk of said tree whereby said tree is supported laterally.

References Cited in the file of this patent

UNITED STATES PATENTS

| | | |
|---|---|---|
| 224,624 | Albrecht | Feb. 17, 1880 |
| 578,998 | Loebs | Mar. 16, 1897 |
| 649,785 | Weinert | May 15, 1900 |
| 1,285,218 | Kershaw | Nov. 19, 1918 |
| 1,300,861 | Otte | Apr. 15, 1919 |
| 1,789,509 | Bergstrom | Jan. 20, 1931 |
| 2,352,699 | Ennis | July 4, 1944 |
| 2,513,637 | Herreshoff et al. | July 4, 1950 |
| 2,537,826 | Hauser | Jan. 9, 1951 |
| 2,543,849 | Hendrickson | Mar. 6, 1951 |

FOREIGN PATENTS

| | | |
|---|---|---|
| 151,361 | Germany | Sept. 2, 1903 |